US008255650B1

(12) United States Patent
Gruttadauria et al.

(10) Patent No.: US 8,255,650 B1
(45) Date of Patent: Aug. 28, 2012

(54) SYSTEMS AND METHODS FOR MAKING INCREMENTAL PHYSICAL TO VIRTUAL BACKUPS OF COMPUTER SYSTEM DATA

(75) Inventors: Brian R. Gruttadauria, Sutton, MA (US); Michael Fisher, Natick, MA (US); Wang Xiaogang, Shanghai (CN); Minqiang Wu, Shanghai (CN)

(73) Assignee: Iomega Corporation, San Diego, CA (US)

( * ) Notice: Subject to any disclaimer, the term of this patent is extended or adjusted under 35 U.S.C. 154(b) by 103 days.

(21) Appl. No.: 12/861,629

(22) Filed: Aug. 23, 2010

Related U.S. Application Data

(63) Continuation of application No. 12/649,263, filed on Dec. 29, 2009, now abandoned.

(51) Int. Cl.
*G06F 12/00* (2006.01)

(52) U.S. Cl. ........ 711/162; 711/165; 711/170; 711/202; 711/216

(58) Field of Classification Search .......... None
See application file for complete search history.

(56) References Cited

U.S. PATENT DOCUMENTS 6,981,114 B1 * 12/2005 Wu et al. ............. 711/162

* cited by examiner

*Primary Examiner* — Shawn X Gu
(74) *Attorney, Agent, or Firm* — Stephen C. Beuerle; Procopio Cory Hargreaves & Savitch LLP

(57) ABSTRACT

Systems and methods are provided for capturing a complete baseline image of the operating environment of a host computer system on an external storage device and for generating incremental backups of the operating environment as changes to the operating environment are identified to create an aggregate baseline image of the operating environment of the host computer system. The external storage device can be disconnected from the host computer system and connected to a remote host where the aggregate baseline image can be used launch a remote host environment on a virtual machine running on the remote host. The remote host environment allows a user to make changes to the remote host environment and the changes can be written back to external storage device as a delta image that is included in the aggregate baseline image. The aggregate baseline image can then be synchronized with the native host.

18 Claims, 9 Drawing Sheets

Create Baseline Image / Incremental Backups of Host Computer

Create Baseline Image /
Incremental Backups of Host
Computer

Use Virtual System on Guest Computer / Create Incremental Deltas

Resynchronize with Host Computer

Update Baseline Image on External Storage Device

Synchronize Aggregate Baseline with Native Host Environment

Update External Storage using Timestamps

Update External Storage using Conflict List

SYSTEMS AND METHODS FOR MAKING INCREMENTAL PHYSICAL TO VIRTUAL BACKUPS OF COMPUTER SYSTEM DATA

CROSS REFERENCE TO RELATED APPLICATION

This application is a continuation of U.S. patent application Ser. No. 12/649,263, filed Dec. 29, 2009, and abandoned Sep. 23, 2010, which is hereby incorporated herein by reference.

FIELD OF INVENTION

The present invention generally relates to computing systems and more particularly relates to generating and using a portable computing environment that may be used on multiple computer systems.

BACKGROUND

With the widespread availability of computer systems, people may use multiple computer systems at work, at home, or during travel. Data mobility has become increasingly important as users may use multiple computer systems to work and/or to perform computing tasks. In conventional computing systems, users may transfer data from one computer system to another through various methods, such as electronic transfer of files across a public or private network or a combination thereof, or transporting data from one computer system to another using a persistent computer readable medium such as a CD-ROM, flash drive, or portable hard disk.

While the data may readily be transported from one computer system to another through these methods, not all computer systems may be able to process the data. For example, a user may have a work computer system that includes a particular piece of software, and the user may have a home computer system that does not include this software. If the user brings a file from the user's work computer that requires the software that is not available on the user's home computer, the user will not be able to make use of the file on the user's home computer. Conventional systems merely make the user's data portable but do not make the computing environment to which the user is accustomed portable to other computer systems.

Furthermore, the user interface and other parameters of the user's primary computer system may be configured very differently from the configuration that the user may encounter on a different computer system.

Therefore, what is needed is a system and method that overcomes these significant problems found in the conventional systems as described above.

SUMMARY

Systems and methods are provided for capturing a complete baseline image of the operating environment of a host computer system on an external storage device and for generating incremental backups of the operating environment as changes to the operating environment are identified to create an aggregate baseline image of the operating environment of the host computer system. The external storage device can be disconnected from the host computer system and connected to a remote host where the aggregate baseline image can be used launch a remote host environment on a virtual machine running on the remote host. The remote host environment allows a user to use the same operating system and application software that is included in the native host environment. The user can make changes to the remote host environment and the changes can be written back to external storage device as a delta image that is included in the aggregate baseline image. The aggregate baseline image can then be synchronized with the native host environment by disconnecting the external storage device from the guest computer system and reconnecting the external storage device to the host computer system.

According to an embodiment, a computer implemented method for creating and maintaining a portable computing environment, where one or more processors are programmed to perform steps is provided. The method includes the step of creating a baseline image on an external storage device connected to a host computer system. The baseline image comprising data represents a first state of a native host environment of the host computer including data and programs installed on the host computer system. The baseline image can be launched on a virtual machine on a guest computer system to provide the user with a remote host environment that includes the operating system and application software included in the baseline image. Identifying changes to the state of the native host environment. Identify the changes to the state of the native host environment includes performing a block by block comparison of a first set of in-use storage locations storing data for the native host environment and a second set of corresponding locations on the external storage device. The method also includes generating a delta image representing the identified changes to the native host environment, the delta image comprising data from changed blocks, and writing the delta image to the external storage device to provide an aggregate baseline image. The aggregate baseline image comprises the baseline image and the delta image.

According to another embodiment, a computer readable storage medium having stored thereon one or more sequences of instructions for causing one or more processors to perform the steps for creating and maintaining a portable computing environment is provided. The steps include creating a baseline image on an external storage device connected to a host computer system. The baseline image represents a first state of a native host environment of the host computer, and the baseline image includes data and programs installed on the host computer system. The baseline image can be launched on a virtual machine on a guest computer system to provide the user with a remote host environment that includes the operating system and application software included in the baseline image. The steps also include identifying changes to the state of the native host environment. Identifying changes to the state of the native host environment includes performing a block by block comparison of a first set of in-use storage locations storing data for the native host environment and a second set of in-use storage locations storing data for an aggregate baseline image stored on the external storage device. The steps further include generating a delta image representing the identified changes to the native host environment, and writing the delta image to the external storage device to create an aggregate baseline image. The aggregate baseline image comprises the baseline image and the delta image.

According to yet another embodiment, a portable storage device for creating and maintaining a portable computing environment is provided. The portable storage device includes an input-output (I/O) port for connecting the portable storage device to a host computer system or a guest computer system, and a computer readable non-volatile memory for storing data and computer executable programmed modules to be executed by a processor. The portable storage device includes a configuration monitoring module configured to monitor the state of a native host environment of the host computer system when the portable storage device is connected to the host computer system and identify changes made to the native host environment. Identifying the changes to the state of the native host environment includes performing a block by block comparison of a first set of in-use storage locations storing data for the native host environment and a second set of in-use storage locations storing data for an aggregate baseline image stored on the external storage device. The configuration monitoring module is further configured to monitor the state of a remote host environment on the guest computer system when the portable storage device is connected to the guest computer system and identify changes made to the remote host environment. The portable storage device also includes a synchronization module. The synchronization module is configured to create a baseline image representing a first state of the native host environment and including data and programs installed on the host computer system and storing the baseline image in the computer readable non-volatile memory, generate a delta image that represents changes made to the remote host environment or the native host environment as identified by the configuration monitoring module, the delta image comprising data from changed blocks, store the delta image in the computer readable non-volatile memory as part of an aggregate baseline image, and update the native host environment using the aggregate baseline image stored in the computer readable non-volatile memory when the portable storage device is connected to the host computer system. The baseline image represents a first state of a native host environment of the host computer, and the baseline image includes data and programs installed on the host computer system. The baseline image can be launched on a virtual machine on a guest computer system to provide the user with a remote host environment that includes the operating system and application software included in the baseline image.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for creating and maintaining a portable computing environment by capturing an image of a host computer system on a portable external storage device that can be disconnected from the host computer system and connected to a guest computer system. For example, one method as disclosed herein allows for creating a baseline image of the host computer system on an external storage device connected to the host computer system, the baseline image can then be launched in a virtual machine running on a remote computer system (also referred to herein as a "guest computer system") to provide a remote host environment that emulates the operating environment of the host computer system. The baseline image includes the operating system and application software and data stored on the user's computer. This provides a fully portable computing environment in which the user can make use of the operating system and computer programs that are part of the native host environment on a different computer system. Changes to the remote host environment are captured and written to the external storage device. The native host environment of the host computer system can be synchronized with these changes by connecting the external storage device to the host computer system.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
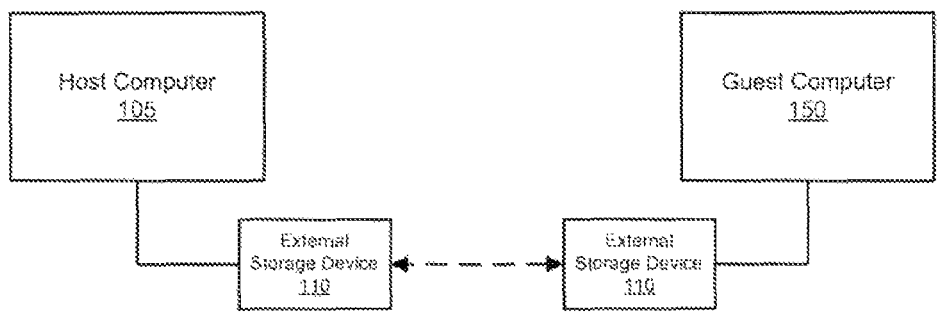
FIG. 1 is a block diagram of a system for creating and maintaining a portable computing environment for a computer system.

FIG. 1 is a block diagram of a system for creating and maintaining a portable computing environment for a computer system according to one embodiment. The system includes an external storage device 110 that can be connected to a first computer system, to store a portable copy of an operating environment from the first computer system, and use the portable copy of the portable operating environment on a second computer system. The portable computing environment includes operating system software and/or application software so that the user can use the same operating system and software programs on the second computer system that they are accustomed to using on the first computer system.

The host computer system 105 is a programmable computing device, such as a personal computer or a laptop that includes one or more processors for executing computer program instructions. The host computer system 105 is the "base" computer system that is typically used by a user used by a user at work or at home to perform various computing tasks. The operating environment of the host computer system 105 including the configuration of the operating system and application software installed on the host computer system 105 and the data stored on the host computer system is collectively referred to herein as the "native host environment."

Guest computer system 150 is also programmable computing device, such as a personal computer or a laptop that includes one or more processors for executing computer program instructions. The guest computer system 150 can have a similar hardware and/or software configuration as host computer system 105 or can have a different hardware and/or software configuration as host computer system 105. The guest computer system is a computer system other than the "base" or home computer system that the user typically uses, but may need to use occasionally or even one time to perform various computing tasks. In an example, the guest computer system 150 is a computer system located at a business center of a hotel and the user needs to work on a presentation or a document while on travel. The user would like to update the presentation materials, but the guest computer system may not a computer program that the user needs to be able to edit some of the presentation materials. However, the systems and methods disclosed herein allow the user to bring a portable computing environment that includes all of the software installed of the user's home computer system and use that software on the guest computer system 150.

The external storage device 110 is portable and can be connected to either the host computer system 105 or to guest computer system 150. The external storage device 110 is connected to an input-output (I/O) port the computer system. The external storage device can be coupled to various types of I/O port on host computer system 105 or guest computer system 150. In one embodiment, the external storage device 110 is connected to a Universal Serial Bus ("USB") port, and in another embodiment, the external storage device is connected to an IEEE 1394 Interface ("Firewire") port. In other embodiments, other types of I/O ports for connecting peripheral devices to a computer system may also be used.

The external storage device 110 includes a persistent memory for storing data representing the state of the native host environment of the host computer system 105. This data is referred to herein as a "baseline image." The baseline image includes the operating system software and/or application software installed on the host computer system 105, as well as application and operating system data and user data stored on the host computer system 105. If changes are made to the native host environment of host computer system 105, such as new software applications being installed on the host computer system 105 or data filed being created or modified, a "delta image" may be generated and written to the external storage device 110. The delta image represents a set of incremental changes that have been made to the native host environment since the baseline image was created.

Additional delta images can be generated to represent additional incremental changes to the native host environment. The baseline image and the one or more delta images are collectively referred to herein as an "aggregate baseline image." The aggregate baseline image can be used to recreate the state of the native operating environment on the guest computer system 150 so that a user can make us of the same operating system and application software that the user has installed on the home computer system 105 regardless of the configuration of guest computer system 150. Guest computer system 150 may have a significantly different hardware configuration than host computer system 105 and may also have different operating system and/or application software installed than the host computer system 105. The emulation of the hardware and software environment of the host computer system on the guest computer system 150 is referred to herein as a "remote host environment."

A user can interact with the remote host environment as if the remote host environment were the native host environment of the host computer system 105. The remote host environment includes the operating system and application software as the native host environment. If any changes are made to the remote host environment, such as creating or modifying a file or installing a new software program. These changes can be identified and a delta image that incorporates these changes can be generated and written to the aggregate baseline image stored on the external storage device 110. When the external storage device 110 is connected to the host computer system 105 in the future, the native host environment can be synchronized with the aggregate baseline image so that he native host environment reflects the changes that were made to the remote host environment.

In an embodiment, the process of generating a baseline image or a delta image on the external storage device can be triggered by a user event (e.g. press button on device or select option in software running on host to initiate backup) or may be initiated automatically by scheduler.

For the sake of clarity, the various embodiments described herein refer to a host computer system 105 and a single guest computer system 150. However, the systems and methods disclosed here may be used to for creating a portable computer environment that can be used on multiple different guest computer systems 150 and synchronized with the native host environment on the host computer system 105.

Figure 2:
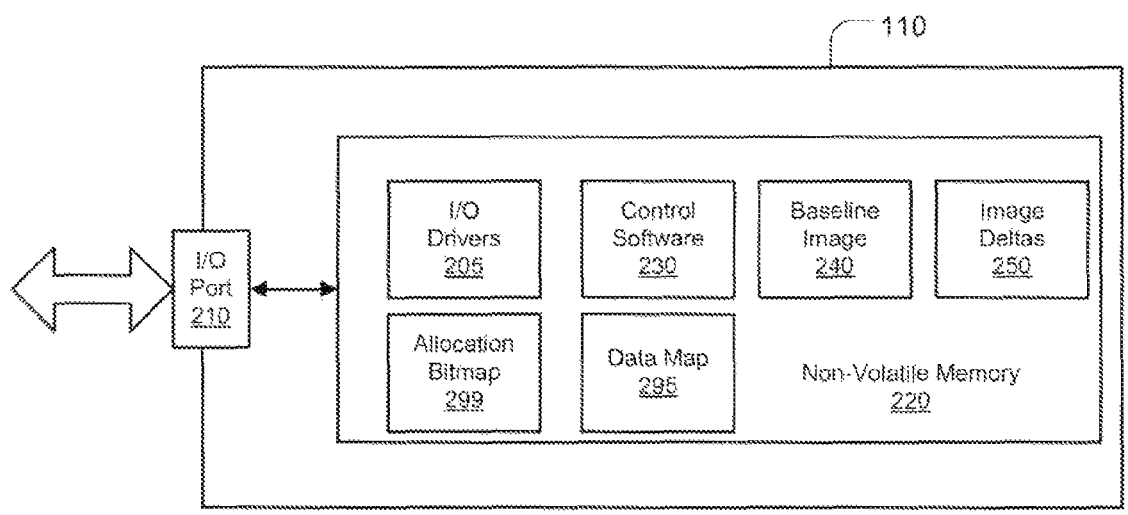
FIG. 2 is a block diagram illustrating an example external storage device that may be used in connection with various embodiments described herein.

FIG. 2 is a block diagram illustrating an example external storage device 110 that may be used in connection with various embodiments described herein. The external storage device 110 includes an input-output ("I/O") port 210 for connecting the external storage device 110 to a computer system, such as host computer system 105 or guest computer system 150. As described above, the external storage device may be connected to a computer system using various types of ports, such as a USB port, a Firewire port, or other type of data port. The external storage device 110 may also be connected to the computer system via a Bluetooth or infrared wireless unit, or any of a variety of wired or wireless access mechanisms. I/O drivers 205 are one or more software drivers for I/O port 210.

The external storage device 110 also includes a non-volatile memory 220 used to store aggregate baseline data (baseline image data 240 and delta image data 250) as well as control software 230. The control software 230 includes executable program code that can be executed on a remote computer system, such as guest computer system 150, to provide a virtual machine that run on the hardware and operating system of the guest computer 105. The virtual machine provides a computing platform upon which the operating system software and/or application software installed on the host computer system 105 and included in the aggregate baseline data can be executed on the guest computer system 150. The emulation of the hardware and software environment of the host computer system on the guest computer system 150 is referred to herein as a "remote host environment."

The external storage device 110 can also include a data map 295 and an allocation bitmap 299. The allocation bitmap 299 represents blocks of storage in the non-volatile memory 220 that are in use or in a free state. The allocation bitmap 299 may be updated each time that data is written to a storage block of the external storage device or if data is deleted from the external storage device. The allocation bitmap may be used in the various processes described below for synchronizing aggregate baseline stored in non-volatile memory 220 with the native host environment stored on the host device 105. The data map 295 provides a logical mapping between data blocks on the host computer system 105 and the external storage device 110. The data map 295 can be created when a baseline image generated and written to the external storage device 220 and updated when the aggregate baseline image stored external storage device 110 is synchronized with the native host environment.

In some embodiments, the external storage device 110 can include a processor (not shown) in communication with non-volatile memory 220 and I/O port 210. The processor can be used to execute the control software 230. In some embodiments, the processor executes the control software 230 rather than relying on a processor of a computer system to which the external storage device 110 is connected to execute the control software 230.

In alternative embodiments, the external storage device 110 is a network storage device that is not directly connected to a computer system. Instead, the external storage device 110 is connected to a computer network and the external storage device 110 is accessed by the computer system via the computer network. The external storage device 110 executes the control software 230 when the external storage device 110 is connected to the computer network. Once the external storage device 110 has been connected to the computer network and the control software 230 has been initialized, a host computer system 105 can connect to the external storage device 100 in order to create an aggregate baseline image or to synchronize the native host environment of the host computer system 105 with the aggregate baseline image. A guest computer system 150 can also connect to the external storage device 110 once the external storage device 110 has been connected to the computer network and the control software 230 has been initialized. The control software 150 can include executable program code that allows a user to launch a remote host environment on the guest computer system 150 using the aggregate baseline image data stored on the external storage device 110.

Figure 3:
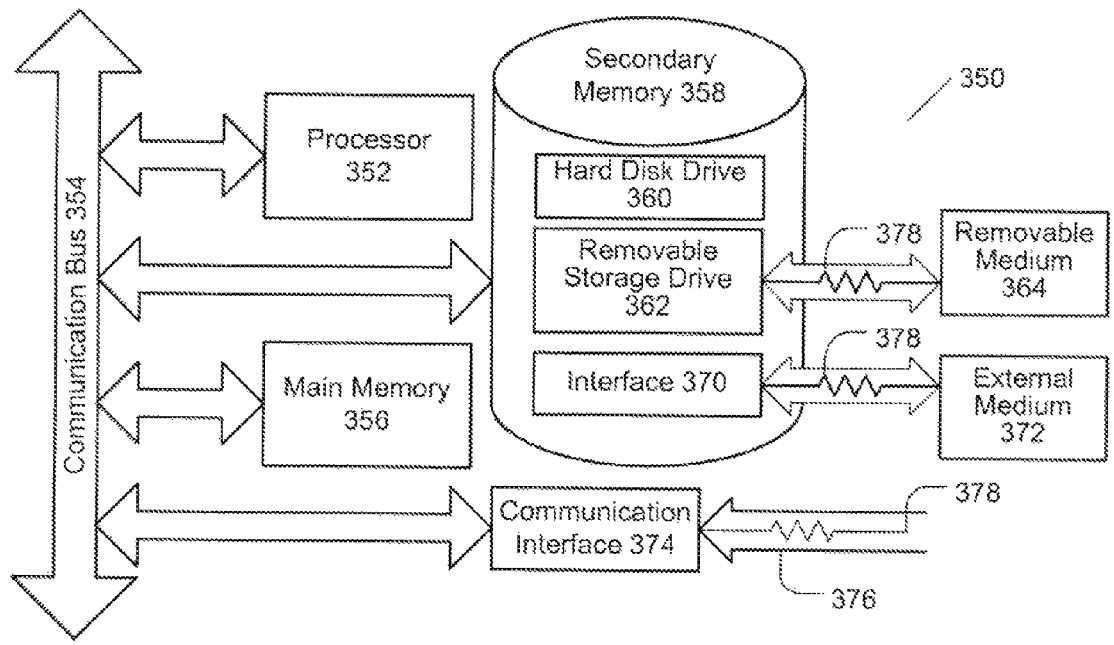
FIG. 3 is a block diagram illustrating an example computer system that may be used in connection with various embodiments described herein.

FIG. 3 is a block diagram illustrating an example computer system 350 that may be used in connection with various embodiments described herein. For example, the computer system 350 may be used to implement the host computer system 105 or the guest computer system 150. However, other computer systems and/or architectures may be used, as will be clear to those skilled in the art.

The computer system 350 preferably includes one or more processors, such as processor 352. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 352.

The processor 352 is preferably connected to a communication bus 354. The communication bus 354 may include a data channel for facilitating information transfer between storage and other peripheral components of the computer system 350. The communication bus 354 further may provide a set of signals used for communication with the processor 352, including a data bus, address bus, and control bus (not shown). The communication bus 354 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 350 preferably includes a main memory 356 and may also include a secondary memory 358. The main memory 356 provides storage of instructions and data for programs executing on the processor 352. The main memory 356 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 358 may optionally include a hard disk drive 360 and/or a removable storage drive 362, for example a floppy disk drive, a magnetic tape drive, a compact disc ("CD") drive, a digital versatile disc ("DVD") drive, etc. The removable storage drive 362 reads from and/or writes to a removable storage medium 364 in a well-known manner. Removable storage medium 364 may be, for example, a floppy disk, magnetic tape, CD, DVD, etc.

The removable storage medium 364 is preferably a computer readable medium having stored thereon computer executable code (i.e., software) and/or data. The computer software or data stored on the removable storage medium 364 is read into the computer system 350 as electrical communication signals 378.

In alternative embodiments, secondary memory 358 may include other similar means for allowing computer programs or other data or instructions to be loaded into the computer system 350. Such means may include, for example, an external storage medium 372 and an interface 370. Examples of external storage medium 372 may include an external hard disk drive or an external optical drive, or and external magneto-optical drive.

Other examples of secondary memory 358 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 372 and interfaces 370, which allow software and data to be transferred from the removable storage unit 372 to the computer system 350.

Computer system 350 may also include a communication interface 374. The communication interface 374 allows software and data to be transferred between computer system 350 and external devices (e.g. printers), networks, or information sources. For example, computer software or executable code may be transferred to computer system 350 from a network server via communication interface 374. Examples of communication interface 374 include a modem, a network interface card ("NIC"), a communications port, a PCMCIA slot and card, an infrared interface, and an IEEE 1394 fire-wire, just to name a few.

Communication interface 374 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 374 are generally in the form of electrical communication signals 378. These signals 378 are preferably provided to communication interface 374 via a communication channel 376. Communication channel 376 carries signals 378 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 356 and/or the secondary memory 358. Computer programs can also be received via communication interface 374 and stored in the main memory 356 and/or the secondary memory 358. Such computer programs, when executed, enable the computer system 350 to perform the various functions of the present invention as previously described.

In this description, the term "computer readable medium" is used to refer to any media used to provide computer executable code (e.g., software and computer programs) to the computer system 350. Examples of these media include main memory 356, secondary memory 358 (including hard disk drive 360, removable storage medium 364, and external storage medium 372), and any peripheral device communicatively coupled with communication interface 374 (including a network information server or other network device). These computer readable mediums are means for providing executable code, programming instructions, and software to the computer system 350.

In an embodiment that is implemented using software, the software may be stored on a computer readable medium and loaded into computer system 350 by way of removable storage drive 362, interface 370, or communication interface 374. In such an embodiment, the software is loaded into the computer system 350 in the form of electrical communication signals 378. The software, when executed by the processor 352, preferably causes the processor 352 to perform the inventive features and functions previously described herein.

Figure 4:
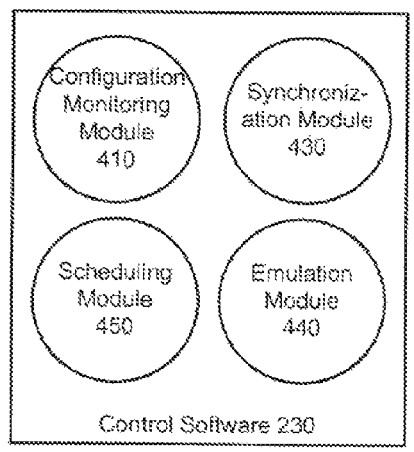
FIG. 4 is a block diagram of control software modules that may be used to implement the control software used in an external storage device illustrated in FIG. 2 according to an embodiment.

FIG. 4 is a block diagram of control software modules that may be used to implement the control software used in an external storage device illustrated in FIG. 2 according to an embodiment. Control software 230 includes a configuration monitoring module 410, a synchronization module 430, an emulation module 440 (includes the VM software), and scheduling module 450.

Configuration monitoring module 410 monitors the state of the native host environment of the host computer system when the external storage device 110 is connected to host computer system 105 and monitors the state of the remote host environment when the external storage device 110 is connected to guest computer system 150. If the configuration of the environment being monitored changes, the configuration monitoring module 410 notifies the synchronization module 430, which may then generate a delta image and write the delta image to the external storage device 110.

When the external storage device 110 is connected to the host computer system 105, synchronization module 430 responds to signals from the configuration monitoring module 410 that the configuration of the native host environment on the host computer system 105 has been modified and generates a delta image to be written to the aggregate baseline image stored on the external storage device 110. When the external storage device 110 is connected to the guest computer system 150, synchronization module 430 responds to signals from the configuration monitoring module 410 that the configuration of the remote host environment on the guest computer system 150 has been modified and generates a delta image to be written to the aggregate baseline image stored on the external storage device 110. When the external storage device 110 is connected to the host computer system 105, synchronization module 410 also synchronizes the native host environment of the host computer system 105 with the aggregate baseline image, if changes were made to the remote host environment and written as a delta image to the aggregate baseline image stored on the external storage device 110.

Emulation module 440 is configured to push virtual machine software to a guest computer 150 if the guest computer does not have virtual machine software installed. Emulation module 440 is also configured initialize the virtual machine on the guest computer system 440 and to launch the remote host environment in the virtual machine on the guest computer system 150.

Scheduling module 450 is configured to initiate the creation of a baseline or delta image on the external storage device 110 at a specified date and/or time or at a predetermined interval. The synchronization module 430 monitors the date and time and triggers scheduled events. In one example, the creation of a baseline image or a delta image is scheduled to occur every two hours. If a baseline image does not exist on the external storage device 110 when the scheduled event is triggered, a baseline image is generated and written to the external storage device. If a baseline image already exists on the external storage device, a delta image is generated to capture any changes that have been made to the native host environment since the baseline image was generated and the delta image is written to the external storage device. If no changes have been made to the native host environment, then no delta image will be generated and written to the external storage device. In an embodiment, the synchronization module is configured to provide a user interface that enables a user to configure how often various events are scheduled. The user interface allows a user to select the frequency at which a particular event should occur or define a specific data and/or time at which a particular event should occur.

Figure 5:
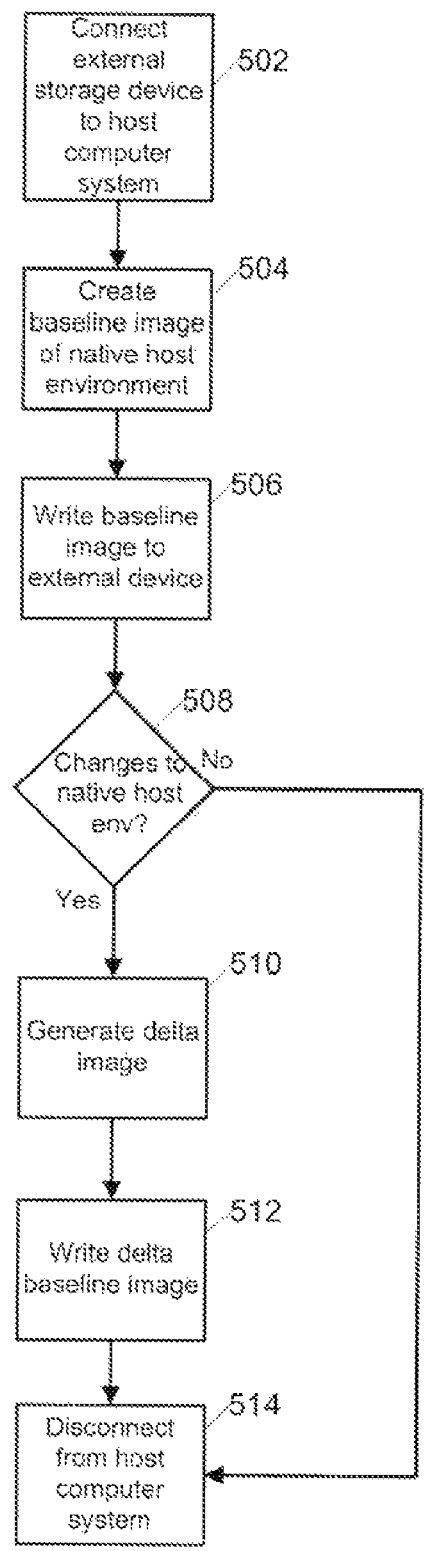
FIG. 5 is a flow diagram illustrating an example process for creating a baseline image of a native host environment of a host computer system according to an embodiment.

FIG. 5 is a flow diagram illustrating an example process for creating a baseline image of a native host environment of a host computer system according to an embodiment. The external storage device 110 is connected to host computer system 105 (step 502), and a baseline image of the native host environment is generated (stage 504). In an embodiment, the baseline image represents a virtualized version of the native host environment that represents the state of the native host environment at the time that the baseline image was generated. The baseline image includes the software, operating system, and applications installed on the physical computer system. The virtualized version of the native host environment is portable and can be executed using a virtual machine running on a different computer system. This allows a user to use the same operating system and application software that is installed on the host computer system 150 on another computer system, such as guest computer system 150, without requiring that the other computer system have the same operating system and applications installed or that the other computer system have a similar hardware configuration as the host computer system 105.

The creation of the baseline image may be triggered in various ways. In one embodiment, a user of the host computer system 105 may manually trigger the creation of the baseline image. For example, in an embodiment, the host computer system 105 has backup software installed that is launched by the user and the user instructs the software to create a backup of the native host environment of the host computer system 105. In another embodiment, the baseline image may automatically created in response to connecting the external storage device 110 to the host computer system 105. Connecting the external storage device 110 to the host computer system 105 causes backup software installed on the host computer system 105 to launch and to generate the baseline image of the native host environment 105. In yet another embodiment, the baseline image is created in response to a scheduled event. For example, the scheduling module 450 of the control software 230 installed on the external storage device 110 can trigger the creation of the baseline image at a predefined date and/or time or at a predefined interval, such as every day, every week, etc.

After the baseline image has been created, the baseline image is written to the non-volatile memory 220 of the external storage device 110 (step 506). The baseline image can then be used to restore the native host environment back to the state of the system at the time that the baseline image was capture or used to launch a remote host environment on a virtual machine running on another computer system. The remote host environment emulates the state of the native host environment at the time that the baseline image was captured.

Once a baseline image of the native host environment has been created on the external storage device, changes to the native host environment, such as installation of new software, creation of new data files, or changes to the configuration of the operating system or other software applications, result in a baseline image that no longer represents the current state of the native host environment. A determination can be made whether the native host environment has changed since the baseline image was created (step 508). In an embodiment, this determination is made by backup software installed on host computer system. In another embodiment, the determination is made by the configuration monitoring module 410 of the control software 230 installed in the non-volatile memory 220 of the external storage device 110. In an embodiment, the control software 230 is launched on the computer system to which the external storage device 110 is connected when the external storage device 110 is connected to the computer system. If no changes have been made to the native host environment, the external storage device may be disconnected from the host computer system (step 514).

If changes have been made to the native host environment, a delta image is generated (step 510). The delta image reflects a set of incremental changes that have been made to the native host environment since the baseline image stored on the external storage device was generated. More than one delta image may be stored on the external storage device 110, and each delta image represents a distinct set of incremental changes that were made to the native host environment since the last baseline image or delta image was captured. The delta image is written to the external storage device 110 (step 512) as part of the aggregate baseline image stored on the external storage device 110. The aggregate baseline image includes the baseline image plus one or more incremental delta images that represent changes that have been made to the baseline image. A portion of the aggregate baseline image may already be stored in the non-volatile memory 220 of the external storage device 110. In an example, the baseline image and a first delta image have previously been written to the external storage device 110, and a new set of changes to the native host environment are identified. A second delta image that includes the new set of changes to the native host environment is generated. The second delta image identifies incremental changes that have been made to the native host environment since the first delta image was generated. Using incremental backups to create an aggregate baseline image as described herein reduces the amount of data that would need to be written to the external storage device 110 each time that an image need to be written to the external storage device.

Figure 6:
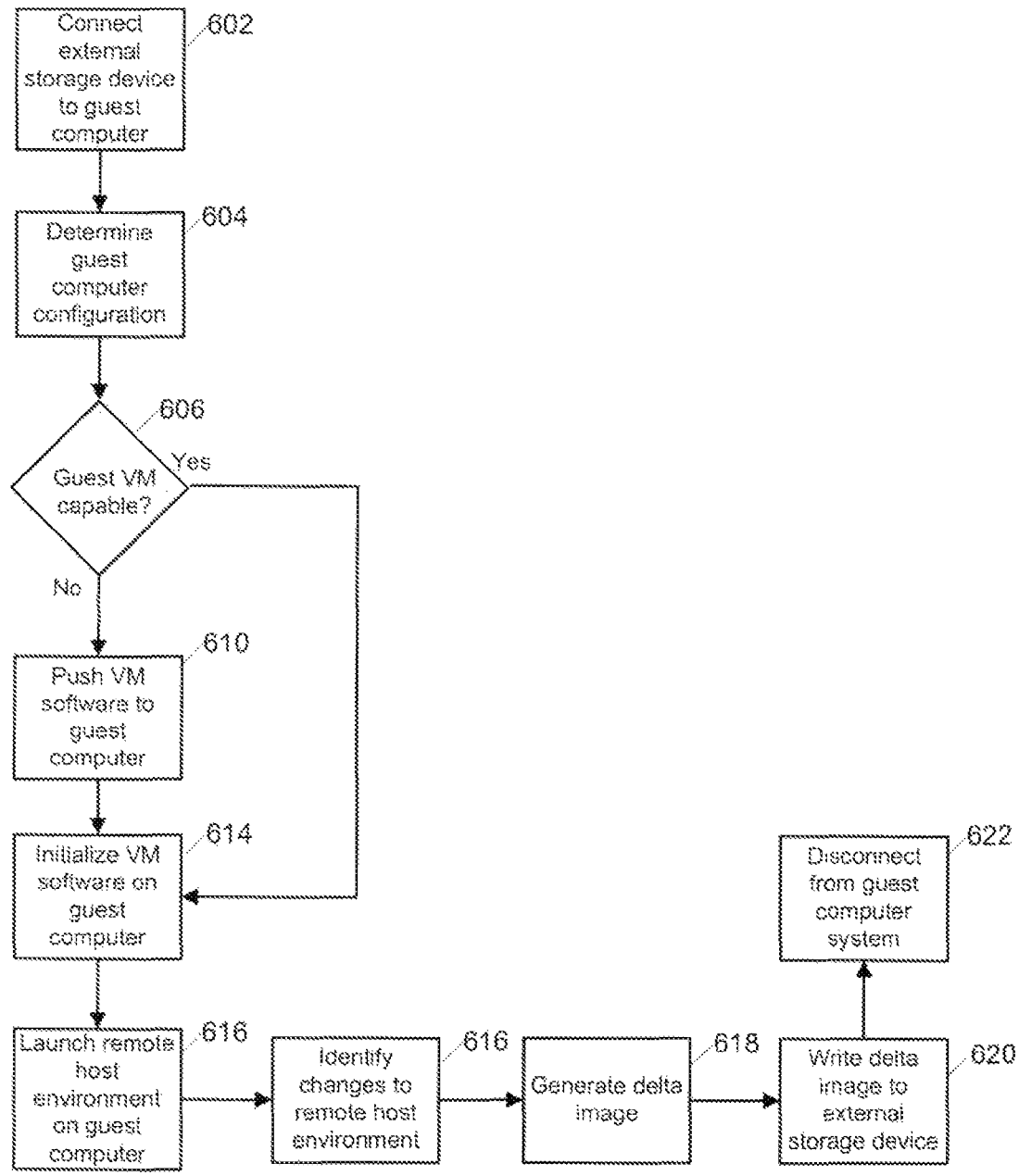
FIG. 6 is a flow diagram illustrating an example process for launching a remote host environment on a guest computer system using a baseline image of a host computer system.

FIG. 6 is a flow diagram illustrating an example process for launching a remote host environment on a guest computer system using an aggregate baseline image of a host computer system. As described above, the external storage device 110 can be disconnected from host computer system 105 and connected to another computer system, such as guest computer system 150 (step 604). In an embodiment, the external storage device 110 is connected to a USB port of the guest computer system 150. In another embodiment, the external storage device 110 is connected to a Firewire port of the guest computer system 150. The external storage device 110 may also be connected to the computer system via a Bluetooth or infrared wireless unit, or any of a variety of wired or wireless access mechanisms.

After connecting the external storage device 110 to the computer system, the configuration of the guest computer system is determined (step 604). In one embodiment, the control software 230 is launched on the guest computer system 150 when the external storage device 110 is connected to the guest computer system 150. The configuration module 410 of the control software 230 includes program code for identifying the configuration of the guest computer system 150. In an embodiment, the configuration module 410 identifies the hardware configuration of the guest computer system 150 as well as any operating system and/or application software installed on the guest computer 105. The configuration module 410 also determines whether the guest computer 105 has virtual machine software installed that can be used to launch a copy of the virtualized native host environment.

Based on the configuration of the guest computer system 150, a determination is made whether the guest computer system 150 is capable of running the virtual machine software used to launch the virtualized version of the native host environment stored on the external storage device as an aggregate baseline image (a baseline image plus delta images representing incremental changes to the baseline image).

If the guest computer system does not have the virtual machine software installed, the virtual machine software is pushed to the guest computer system 150 from the external storage device 110 (step 610). In an embodiment, the emulation module 440 pushes a copy of the virtual machine software to the guest computer system 150 and initializes an installation program that installs the virtual machine software on the guest computer system 150. If the guest computer system already has the virtual machine software installed, step 610 is skipped and the process continues with step 614.

The virtual machine software is then initialized on the guest computer system 150 (step 614) to create a virtual machine executing on the guest computer system 150. The virtual machine software executes on the hardware and operating system software of the guest computer system 150. The virtual machine provides a system platform that supports the execution of the operating system and application software included in the aggregate baseline image on the guest computer system 150. This allows the user to run the same operating system and applications software installed on the user's host computer system 105 on the guest computer system 150 regardless of the hardware configuration of the guest computer system 150 and whether the guest computer system 150 has the same operating system and/or application software installed as the host computer system 105.

After the virtual machine has been initialized on the guest computer system 150, a remote host environment is launched in the virtual machine on the guest computer system 150 (step 616) using the aggregate baseline data stored on external storage device 110. The remote host environment emulates the state of the native host environment at the time that the most recent delta image included in the aggregate baseline data was captured, and includes the operating system and application software that the user is accustomed to using on the user's host computer system 105.

Once the remote host environment has been launched on the guest computer system 150, the user can interact with the various software applications included in the remote host environment as if the user were working on the host computer system 105. As the user interacts with the applications in the remote host environment, the user may create new data files or change existing data files. These changes to the remote host environment can be captured in a delta image, stored on the external storage device, and written to host computer system 105 the next time that the external storage device 110 is connected to the host computer system 105 in order to keep the native host environment of the host computer system 105 synchronized with the remote host environment.

Any changes have been made to the remote host environment since the remote host environment has been launched on the guest computer system 150 are identified (step 616). For example, new software programs may have been installed in the remote host environment by the user, data files may have been created or modified, or changes to operating system or applications program settings may have been made. In an embodiment, the configuration monitoring module 410 identifies changes that have been made to the remote host environment since the remote host environment has launched by comparing the baseline image and the delta images of the aggregate baseline image stored on the external storage device to the state of the remote host environment.

If changes have been made to the remote host environment, a delta image is generated that includes the changes that were made to the remote host environment (step 618). The delta image only includes an incremental set of changes that were made to the remote host environment since the aggregate baseline image from the external storage device 110 was used to launch the remote host environment on the guest computer system 150. The delta image is then written to the non-volatile memory 220 of the external storage device 110 (step 620) as part of the aggregate baseline image stored on the external storage device 110. The aggregate baseline image includes the baseline image plus one or more incremental delta images that represent changes that have been made to the baseline image. Once the delta image has been written to the external storage device 110, the external storage device 110 can be disconnected from guest computer system 150.

Figure 7:
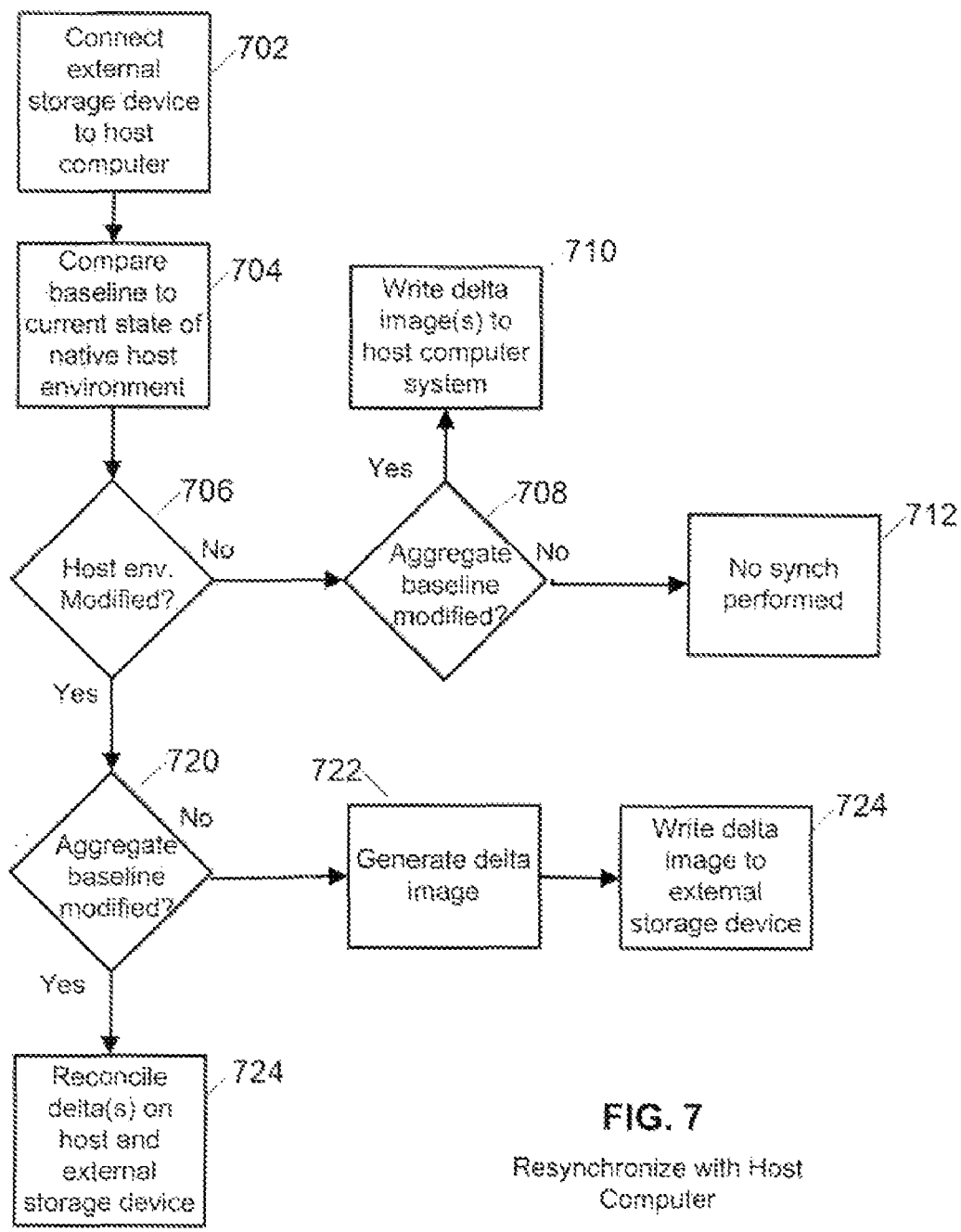
FIG. 7 is a flow diagram illustrating an example process for synchronizing a native host environment of a host computer with an aggregate baseline image stored on an external storage device according to an embodiment.

FIG. 7 is a flow diagram of an example process for synchronizing a native host environment of a host computer with an aggregate baseline image stored on an external storage device according to an embodiment. The external storage device 110 is connected to host computer system 105 (step 702). Because the external storage device 110 has been disconnected from host computer system 105, the aggregate baseline image stored on the external storage device can be different from the current state of the native host environment of the host computer system 105. The aggregate baseline image can be different from the state of the native host environment if: (1) the native host environment was modified while the external storage device 110 was disconnected from the host computer system 105, (2) the remote host environment was modified while the external storage device 110 was connected to the guest computer system 150, or (3) both the native host environment and the remote host environment were modified.

The aggregate baseline stored on the external storage device 110 is compared to the current state of the native host environment (step 704) to determine whether the aggregate baseline differs from the current state of the native host environment. A determination is then made to see if the native host environment was modified since the aggregate baseline was created (step 706). If the native host environment was not modified, then a determination is made whether the aggregate baseline stored on the external storage device 110 was modified (step 708). If the aggregate baseline was not modified, then process then continues with step 712, no synchronization is required, because neither the native host environment nor the aggregate baseline image, and the process terminates.

Figure 9:
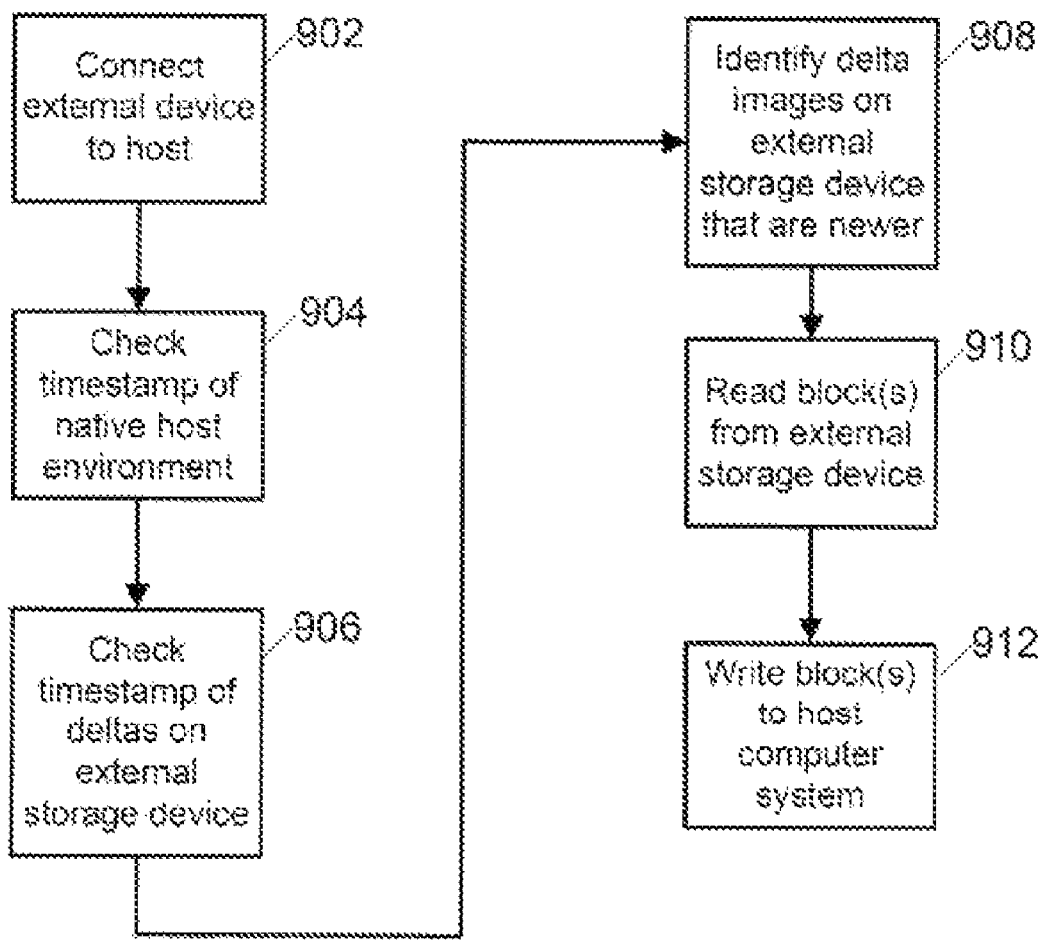
FIG. 9 is a flow diagram illustrating an example process for synchronizing a native host environment of a host computer system with an aggregate baseline image stored on the external storage device according to an embodiment.

If the aggregate baseline was modified, at least one delta image should be included in the aggregate baseline image that was updated by the guest computer system 150 after the last time that the aggregate baseline image stored on the external storage device 110 was synchronized with the state of the native host environment of host computer system 105. The at least one delta image created since the last time that the aggregate baseline was synchronized with the state of the native host environment will be copied from the external storage device 110 and written to the native host environment. For example, if a user modified or created a new file while working in the remote host environment and installed a new software application, the files that were modified or created by the user and the files for the new software application are copied to the host computer system in order to synchronize the native host environment with the changes that the user made while working remotely (step 710). FIG. 9 illustrates one example of a process for updating the native host environment on the host computer system 105 using the aggregate baseline image stored on the external storage device.

Figure 8:
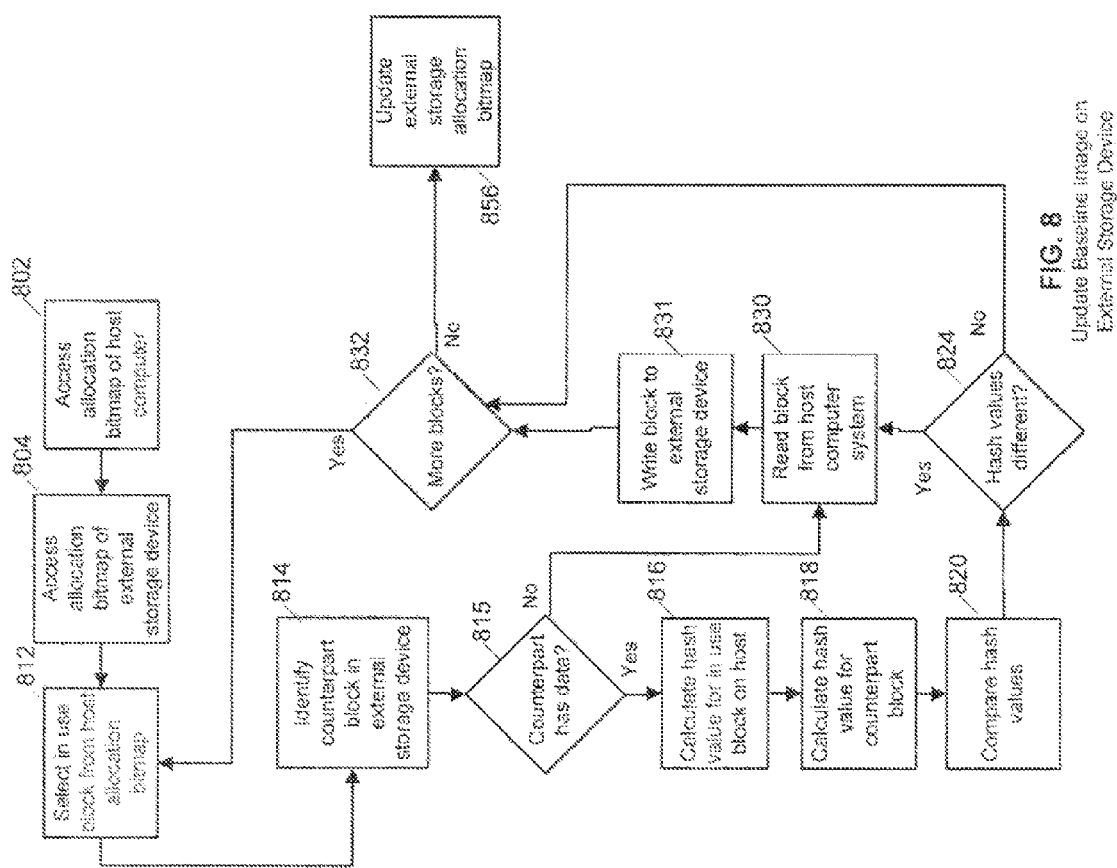
FIG. 8 is a flow diagram illustrating an example process for generating a delta image representing changes to the native host environment of a host computer system according to an embodiment.

Returning now to FIG. 7, if the native host environment was modified (as determined in step 706), a determination as to whether the aggregate baseline stored on the external storage device 110 was modified (step 720). If the native host environment was modified and the aggregate baseline was not, then a delta image is generated (step 722). The delta image includes the incremental changes to the native host environment that were made since the aggregate baseline stored on the external storage device 110 was generated. The delta image is then written to the external storage device 110. FIG. 8 illustrates an example of a process for generating a delta image and writing the delta image to the external storage device 110.

Returning now to FIG. 7, if the native host environment and the aggregate baseline have both been modified (step 720), then a reconciliation of the differences between the differences in the native host environment and the aggregate baseline image stored on the external storage device 110 is performed (step 724). For files that have changed in one location but not the other location, the version of the file that was modified is copied from the location where the modified copy was stored to the other locations. For example, if an edited version of a photo file is found in the aggregate baseline stored on the external storage device 110, the edited version of the photo file can be copied from the external storage device 110 to the host computer system 105.

Figure 11:
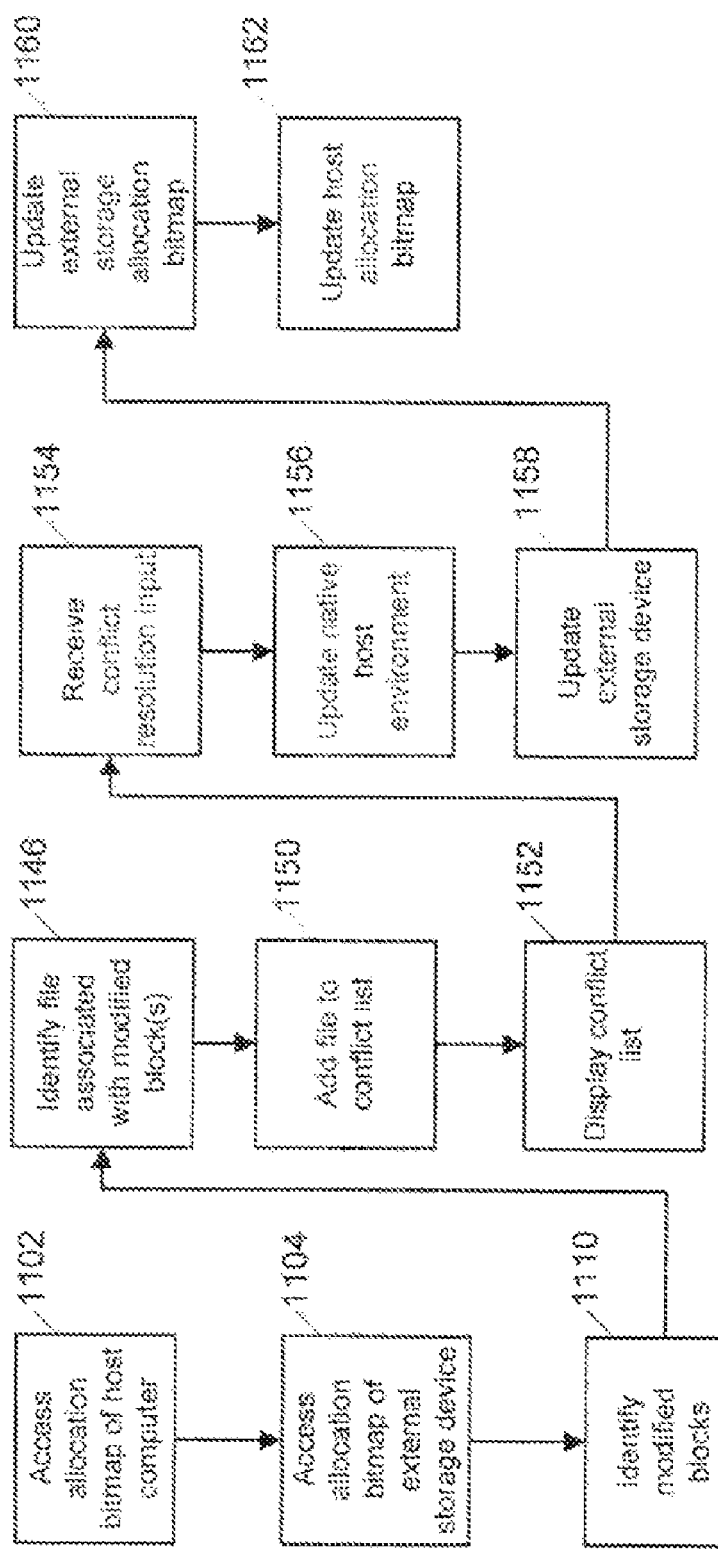
FIG. 11 is a flow diagram illustrating yet another example process for synchronizing a native host environment of a host computer with an aggregate baseline image stored on an external storage device according to an embodiment.

In an embodiment, the synchronization module 430 identifies differences between the native host environment and the aggregate baseline image stored on the external storage device 110. In an embodiment, the synchronization module 430 provides a user interface that lists a set of files that have changed in both native host environment and the aggregate baseline image stored on the external storage device 110. FIG. 11, which is described in greater detail below, illustrates an example process for identifying files that have changed in the native host environment or in the aggregate baseline image. The user can select which version of the file to keep. The selected version is the copied from the location on which the selected version was found and copied to the other location. For example, if the user selects a version of a document that was found in the host computer system that version of the document will be included in a delta image that is written to the external storage device 110.

FIG. 8 is a flow diagram illustrating an example process for generating a delta image representing changes to the native host environment of a host computer system according to an embodiment. In one embodiment, steps 510 and 512 of FIG. 5 can be implemented using the process described in FIG. 8.

The method illustrated in FIG. 8 uses an allocation bitmap associated with the native host environment on the host computer system 105 with an allocation bitmap associated with the aggregate baseline image stored on the external storage device 110. The allocation bitmap associated with the native host environment of the host computer system 105 represents blocks of storage in one or more memory locations on the host computer system, such as a hard disk drive or other persistent storage, where data used by the native host environment can be stored. The data may include application data, executable program code, and other types of data that can be used in the native host environment and can be included in the aggregate baseline image stored on the external storage device 110.

The allocation bitmap includes a bit that represents each block of storage. A storage block can be marked as "in use" indicating that the block has data stored in that block of memory or the block may be marked as "free" indicating that the block is not in use and does not have data stored in that block. When data is written to a storage block, the bit of the allocation bitmap associated with the block of data is updated to the "in use" state. Similarly, if data is deleted from a storage block, the bit associated with the block of data in the allocation bitmap is updated to the "free" state. In some embodiments, the allocation bitmap may have a timestamp associated with the bitmap to indicate when the bitmap was last updated. According to an alternative embodiment, each block of storage represented in the allocation bitmap may have a timestamp indicating when that the block was last updated.

The external storage device 110 can also include an allocation bitmap 299 that represents blocks of storage in non-volatile memory 220 that are in use or in a free state. The allocation bitmap 299 may be updated each time that data is written to a storage block of the external storage device or if data is deleted from the external storage device.

The allocation bitmap of the native host environment can be compared to the allocation bitmap 299 of the external storage device 110 to determine whether any changes have been made to the native host environment since the aggregate baseline image stored on the external storage device 110 was created and whether any changes have been made to the aggregate baseline image stored on the external storage device 110 since the native host environment was last updated. The allocation bitmaps can be used to identify which blocks have data stored in them on both the host computer system 105 and the external storage device 110. Only the data stored in the used blocks need to be compared to determine whether the native host environment of the host computer system 105 or the aggregate baseline image on the external storage device 110 have been modified.

The process begins with accessing the allocation bitmap of host computer system (step 802) and accessing the allocation bitmap 299 of the external storage device 110 attached to the host computer system 105 (step 804). Each "in use" block from the allocation bitmap of the host computer system is then compared to a corresponding block in the aggregate baseline image to determine whether the data in the block has been changed in the native host environment, the aggregate baseline image, or both. In the process illustrated in FIG. 10, conflicts where both version of the block of data have been modified are resolved by keeping the block of data that has been modified most recently, based on the timestamp associated with the block of data.

An "in use" block is selected from the allocation bitmap of host computer system (step 806) and a counterpart block in non-volatile memory 220 of the external storage device 110 is identified (step 814). In an embodiment, a data map 295 is stored in the non-volatile memory 295 that includes a logical mapping between data blocks on the host computer system 105 and the external storage device 110. The data map 295 can be created when a baseline image generated and written to the external storage device 220 and updated when the aggregate baseline image stored external storage device 110 is synchronized with the native host environment.

A determination is made whether the counterpart block of the external storage device 110 is also has data stored in it by checking the allocation bitmap 299 of the external storage device (step 815). If the counterpart block does not have data stored in it, then the data block from the native host environment and the corresponding data block from the external storage device 110 are out of synch, because the data block from the native host environment is marked "in use" while the corresponding block of data from the aggregate baseline image from the external storage device 110 is marked as "free." The method continues with step 826 where the difference will be resolved.

If the counterpart block of the external storage device 110 is also in use, the data from the block from the native host environment is read and a hash value is generated based on the data stored in the block (step 816). The data from the counterpart block on the external storage device 110 is also read and a hash value is generated based on the data stored in the block (step 818). The hash value can be generated using various techniques known in the art. The hash values are compared (step 820) and a determination is made to whether the block of data from the native host environment is different from the data stored in the counterpart block stored on the external storage device 110 (step 824). The hash values for the data blocks will be different if the data stored in the data blocks is different. If the hash values are not different, then the data in the blocks is the same and the native host environment and the aggregate baseline image are synchronized with respect to that block. The process then continues with step 1032, where a determination is made whether there are any more blocks of data that are marked as "in use" in the allocation bitmap for the native host environment.

If the hash value were different, the corresponding block of data is read from the host computer system 105 (step 830) and the data read from the host computer system 105 is written to the data block on the external storage device 110 that corresponds to the data from block read from the host computer system (step 831).

A determination is made whether there are more in use blocks from the allocation bitmap associated with the host storage device to be compared with their corresponding blocks from the external storage device to see if the data associated with the blocks has changed in either the native host environment or in the aggregated baseline image stored on the external storage device 110 (step 832). If there are more "in use" blocks to be checked from the host allocation bitmap, a next "in use" blocks block to be checked for differences is selected (step 812). Otherwise, if no more "in use" blocks from the host allocation bitmap for the host computer system remain to be checked, the allocation bitmap for the external storage device 856 is updated to reflect any blocks of data that were written to the aggregate baseline image from the host computer system 105.

FIG. 9 is a flow diagram illustrating an example process for synchronizing a native host environment of a host computer system with an aggregate baseline image stored on the external storage device according to an embodiment.

The external storage device 902 is connected to the host computer system 105 (step 902). A timestamp associated with the native host environment is checked to determine when the data related to the native host environment was last updated (step 904). The non-volatile memory 220 of the external storage device 110 is then checked to determine whether there are any delta images included in the aggregate baseline stored on the external storage device that were generated after the native host environment was last updated (step 908). If there are delta images on the external storage device that were generated after the native host environment was last updated, the blocks of data associated with the identified delta images are read from the external storage device 110 (step 910) and are written to the host computer system 105. The process enables the native host environment to be updated with changes that have been made to the aggregate baseline image that was launched on a remote computer system.

Figure 10:
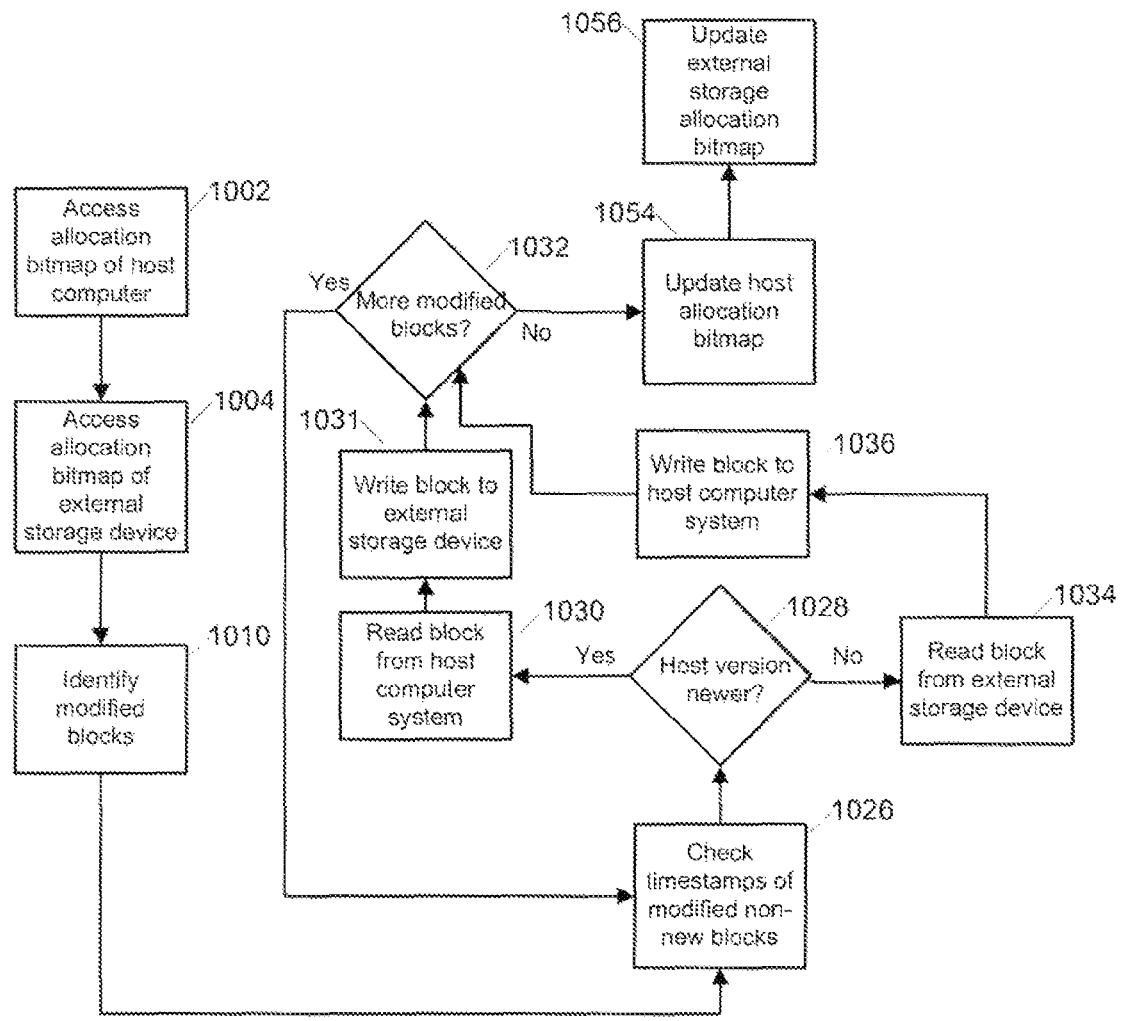
FIG. 10 is a flow diagram illustrating another example process for synchronizing a native host environment of a host computer with an aggregate baseline image stored on an external storage device according to an embodiment.

FIG. 10 is a flow diagram of another example process for synchronizing a native host environment of a host computer with an aggregate baseline image stored on an external storage device according to an embodiment. The embodiment illustrated in FIG. 10 compares data from the native host environment of host 105 to the aggregate baseline image stored on the external storage device 110 on a block by block basis to identify changes made to the native host environment and/or the aggregate baseline image.

The method illustrated in FIG. 10 uses an allocation bitmap associated with the native host environment on the host computer system 105 with an allocation bitmap associated with the aggregate baseline image stored on the external storage device 110. The allocation bitmap associated with the native host environment of the host computer system 105 represents blocks of storage in one or more memory locations on the host computer system, such as a hard disk drive or other persistent storage, where data used by the native host environment can be stored. The data may include application data, executable program code, and other types of data that can be used in the native host environment and can be included in the aggregate baseline image stored on the external storage device 110.

The allocation bitmap includes a bit that represents each block of storage. A storage block can be marked as "in use" indicating that the block has data stored in that block of memory or the block may be marked as "free" indicating that the block is not in use and does not have data stored in that block. When data is written to a storage block, the bit of the allocation bitmap associated with the block of data is updated to the "in use" state. Similarly, if data is deleted from a storage block, the bit associated with the block of data in the allocation bitmap is updated to the "free" state. In some embodiments, the allocation bitmap may have a timestamp associated with the bitmap to indicate when the bitmap was last updated. According to an alternative embodiment, each block of storage represented in the allocation bitmap may have a timestamp indicating when that the block was last updated.

The external storage device 110 can also include an allocation bitmap 299 that represents blocks of storage in non-volatile memory 220 that are in use or in a free state. The allocation bitmap 299 may be updated each time that data is written to a storage block of the external storage device or if data is deleted from the external storage device.

The allocation bitmap of the native host environment can be compared to the allocation bitmap 299 of the external storage device 110 to determine whether any changes have been made to the native host environment since the aggregate baseline image stored on the external storage device 110 was created and whether any changes have been made to the aggregate baseline image stored on the external storage device 110 since the native host environment was last updated. The allocation bitmaps can be used to identify which blocks have data stored in them on both the host computer system 105 and the external storage device 110. Only the data stored in the used blocks need to be compared to determine whether the native host environment of the host computer system 105 or the aggregate baseline image on the external storage device 110 have been modified.

The process begins with accessing the allocation bitmap of host computer system (step 1002) and accessing the allocation bitmap 299 of the external storage device 110 attached to the host computer system 105 (step 1004). Each "in use" block from the allocation bitmap of the host computer system is then compared to a corresponding block in the aggregate baseline image to determine whether the data in the block has been changed in the native host environment, the aggregate baseline image, or both. In the process illustrated in FIG. 10, conflicts where both version of the block of data have been modified are resolved by keeping the block of data that has been modified most recently, based on the timestamp associated with the block of data.

Modified blocks are then identified (step 1010). The modified blocks are a pair of blocks, one from the native host environment and the other from the aggregate baseline image stored on the external storage device, that correspond to one another, but there is a discrepancy between the data stored in the block in the native host environment and the data stored in the block from the aggregate baseline image. These discrepancies may be caused by modifications that were made to the native host environment, the aggregate baseline image, or to both the aggregate baseline image and the native host environment, and the changes have not yet been synchronized between the native host environment and the aggregate baseline image. For example, one or more files may have been deleted from the native host environment but the aggregate baseline image stored on the external storage device still includes those files, or one or more files in the aggregate baseline image may have been modified but the changes have not yet been synchronized with the native host environment on host computer system 105.

In an embodiment, a data map 295 is stored in the non-volatile memory 295 that includes a logical mapping between data blocks on the host computer system 105 and the external storage device 110. The data map 295 can be created when a baseline image generated and written to the external storage device 220 and updated when the aggregate baseline image stored external storage device 110 is synchronized with the native host environment. In an embodiment, the data map 295 can be used to identify corresponding blocks from the native host environment and the external storage device 110 in order to determine whether the blocks have been modified.

The allocation bitmaps of the host computer system and the external storage device may then be compared to determine whether there are any modified blocks. Three possible scenarios may occur when identifying modified blocks: (1) a block of data from the native host environment and/or the has been modified, (2) a block of data in the native host environment and its corresponding block of data in the external storage device are both marked as in use, and (3) new data has been added to one of the native host environment or the aggregate baseline image and there is no mapping defined between the native host environment or the aggregate baseline image for the blocks storing the new data.

In the first scenario described above, a block stored on the host computer system is marked as in use but the allocation bitmap for the external storage device indicates that the corresponding block in the aggregate baseline image is not in use. Alternatively, a block stored on the host computer system is marked as "free" in the host allocation bitmap, but the allocation bitmap for the external storage device indicates that the corresponding block in the aggregate baseline image is marked as in use. The block is identified as having been modified. The corresponding blocks will be added to a list of modified data blocks that will be synchronized to remove the discrepancies between the data in the two environments.

In the second scenario described above, a block of data in the native host environment and its corresponding block of data in the external storage device are both marked as in use, and the data in the corresponding blocks is compared to determine whether the data has been modified in one or both of the environments. The data from the block in the native host environment is read and a hash value is generated based on the data stored in the block. The data from the counterpart block on the external storage device 110 is also read and a hash value is generated based on the data stored in the counterpart block. If the two hash values are different, then the data in the two blocks is different, which indicates that the data in one or both of the environments has been modified. In one embodiment, if the hash values for the corresponding blocks are different, the corresponding blocks are added to a list of modified data blocks that will be synchronized to remove the discrepancies between the data in the two environments.

In the third scenario described above, new data has been added to one of the native host environment or the aggregate baseline image and there is no mapping defined between the native host environment or the aggregate baseline image for the blocks storing the new data. If new data has been added to either the native host environment or the aggregate baseline image, there will not be a corresponding entry in the data map 295 for that block. If new data in the native host environment is copied from the host computer system 105 to the aggregate baseline image stored on the external storage device 110 or vice versa, and the data map 295 and the allocation bitmap 299 of the external storage device 110 and the allocation bitmap of the host computer system 105 will be updated to reflect the relationship between the corresponding blocks of data.

The timestamps associated with the modified blocks are compared (step 1026) to determine whether the native host environment of the host computer system 105 or the aggregate baseline image stored on the external storage device 110 has been updated more recently. In some embodiments, the allocation bitmap may have a timestamp associated with the bitmap to indicate when the bitmap was last updated. According to an alternative embodiment, each block of storage represented in the allocation bitmap may have a timestamp indicating when that the block was last updated.

For each modified block identified in step 1010, a determination is made whether the data in the native host environment of the host computer system 105 is new or has been updated more recently than the data in the external storage device 110 (step 1028). In the embodiment illustrated in FIG. 10, if the data is not new, the block of data that has most recently been updated will be kept and the data in the corresponding block will be updated to match the data from the more recently updated block.

If the block of data from the host computer system is older than the corresponding block of data from the aggregate baseline image stored on the external storage device 110 or the block of data on the external storage device 110 is new, the corresponding block of data is read from the external storage device 110 (step 1034) and the data read from the external storage device 110 is written to the data block at the host computer system 105 that corresponds to the data from block read from the external storage device 110 (step 1036). If the block of data on the external storage device 110 was new, there will not be a corresponding block on the host computer system included in data map 295. Therefore, the new block of data will be written to the host device computer system 105, and a mapping between the data block on the external storage device and the data block on the host computer system 105 will be added to the data map 295.

If the block of data from the aggregate baseline image stored on the external storage device 110 is older than the corresponding block of data from the native host environment stored on the host compute system 105, the corresponding block of data is read from the host computer system 105 (step 1030) and the data read from the host computer system 105 is written to the data block on the external storage device 110 that corresponds to the data from block read from the host computer system (step 1031). If the block of data on the host computer system 105 was new, there will not be a corresponding block on the external storage device 110 included in data map 295. Therefore, the new block of data will be written to the host device 110, and a mapping between the data block on the external storage device and the data block on the host computer system 110 will be added to the data map 295.

A determination is made whether there are more modified blocks to be processed (step 1032). If there are more modified blocks to be processed, a next block is selected and processing continues with step 1026. Otherwise, if no more modified blocks remain to be processed, the allocation bitmap for the host device is updated with and blocks of data that were written to the host computer system or deleted from the computer system (step 1054). The allocation bitmap for the external storage device is updated with and blocks of data that were written to the external storage device or deleted from the external storage device (step 1056).

FIG. 11 is a flow diagram of another example process for synchronizing a native host environment of a host computer with an aggregate baseline image stored on an external storage device according to an embodiment. In the process illustrated in FIG. 11, if data has been modified on both the native host environment and in the aggregate baseline image, a list of files associated with the modified data is created and the user can select which version of the files are to be kept and used to synchronize the native host environment to the aggregate baseline image.

The process begins with accessing the allocation bitmap of host computer system (step 1102) and accessing the allocation bitmap 299 of the external storage device 110 attached to the host computer system 105 (step 1104). Each "in use" block from the allocation bitmap of the host computer system is then compared to a corresponding block in the aggregate baseline image to determine whether the data in the block has been changed in the native host environment, the aggregate baseline image, or both. In the process illustrated in FIG. 11, conflicts where both version of the block of data have been modified are resolved by keeping the block of data that has been modified most recently, based on the timestamp associated with the block of data.

An "in use" block is selected from the allocation bitmap of host computer system (step 1106) and a counterpart block in non-volatile memory 220 of the external storage device 110 is identified (step 1114). In an embodiment, a data map 295 is stored in the non-volatile memory 220 that includes a logical mapping between data blocks on the host computer system 105 and the external storage device 110. The data map 295 can be created when a baseline image generated and written to the external storage device 220 and updated when the aggregate baseline image stored external storage device 110 is synchronized with the native host environment.

A determination is made whether the counterpart block of the external storage device 110 is also has data stored in it by checking the allocation bitmap 299 of the external storage device (step 1115). If the counterpart block is not in use, then the data block from the native host environment and the corresponding data block from the external storage device 110 are out of synch, because the data block from the native host environment is marked "in use" while the corresponding block of data from the aggregate baseline image from the external storage device 110 is marked as "free." The method continues with step 1126 where a file or files associated with the native host environment are identified.

If the counterpart block of the external storage device 110 is also in use, the data from the block from the native host environment is read and a hash value is generated based on the data stored in the block (step 1116). The data from the counterpart block on the external storage device 110 is also read and a hash value is generated based on the data stored in the block (step 1118). The hash value can be generated using various techniques known in the art. The hash values are compared (step 1120) and a determination is made to whether the block of data from the native host environment is different from the data stored in the counterpart block stored on the external storage device 110 (step 1124). The hash values for the data blocks will be different if the data stored in the data blocks is different. If the hash values are not different, then the data in the blocks is the same and the native host environment and the aggregate baseline image are synchronized with respect to that block. The process then continues with step 1132, where a determination is made whether there are any more blocks of data that are marked as "in use" in the allocation bitmap for the native host environment.

If the hash values were different, a file or files associated with the data block from the native host environment and the corresponding data block from the aggregate baseline image stored on the external storage device 110 are identified (step 1126). The file or files identified are added to a conflict list (step 1130). The conflict list identifies files that may have been modified in both the native host environment and in the aggregate baseline image stored on the external storage device 110. This situation could occur if the external storage device were disconnected from the host computer system 105 and connected to a guest computer system 150, and changes were made to the remote host to native host environment and the remote host environment. For example, a user can make changes to the native host environment on the host computer system 105 after the external storage device 110 has been disconnected from the host computer system 105. The aggregate baseline image stored on the external storage device 110 would no longer match the configuration of the native host environment. Meanwhile, the external storage device can be connected to a guest computer system 150 and a user can make changes to the remote host environment and these changes are written back to the aggregate baseline image. One or more conflicting changes may have been made to the native host environment and the aggregate baseline image. By identifying the files that have been modified in one or both of the native host environment and the aggregate baseline image, a user can be presented with the list of files and can select which set of files should be kept and synchronized in both the native host environment and the aggregate baseline image.

A determination is made whether there are more in use blocks from the allocation bitmap associated with the host storage device to be compared with their corresponding blocks from the external storage device to see if the data associated with the blocks has changed in either the native host environment or in the aggregated baseline image stored on the external storage device 110 (step 1132). If there are more "in use" blocks to be checked from the host allocation bitmap, a next "in use" blocks block to be checked for differences is selected (step 1112).

Otherwise, if no more "in use" blocks from the host allocation bitmap for the host computer system remain to be checked, any data blocks from the external storage device that include data and were not already compared to a corresponding data block from the host device are identified (step 1140). There may be blocks that include data on the external storage device 110 that do not correspond to a block that is marked "in use" in the allocation map associated with the native host environment. This situation can occur if files were deleted from or modified in the native host environment since the aggregate baseline image stored on the external storage device 110 was last updated. This situation can also occur if the external storage device 110 were connected to a guest computer system 150, a remote host environment was launched from the external storage device, and changes were made to the remote host environment that were written back to the aggregate baseline image stored on the external storage device 110.

An identified block from the unchecked used blocks from the external storage device 110 is selected (step 1142) and a counterpart block in the native host environment of the host computer system 105 that corresponds to the selected block from the external storage device is identified (step 1144). A file or files associated with the data block from the native host environment and the corresponding data block from the aggregate baseline image stored on the external storage device 110 are identified (step 1146). The file or files identified are added to a conflict list (step 1150).

The conflict list is then displayed to the user in a user interface that displays the list of the file conflicts and allows the user to provide input for correcting the conflicts (step 1152). In an embodiment, the synchronization module 430 generates the user interface for display on to a user on the host computer system 105 when the external storage device 110 is connected to the host computer system 105. In an embodiment, the user interface displays the name and location of a file from the conflict list and a timestamp that indicates when the file was last updated. The location information can include the filename and directory on native host environment or on external storage device for each file on the conflict list. The user can elect to ignore the conflict and take no action or can resolve the conflict by selecting a file to keep. For example, a file may have been updated on both the native host environment and in aggregate baseline image. The user interface allows a user to select which version that the user would like to keep and the selected version of the file would be synchronized to both the external storage device and the native host environment.

Conflict resolution input is received from the user (step 1154) and the native host environment is updated (step 1156) and aggregate baseline image stored on the external storage device 110 is updated if necessary to reflect the selections provided by the user (step 1158). The allocation bitmap for the host device is updated with and blocks of data that were written to the host computer system or deleted from the computer system (step 1160). The allocation bitmap for the external storage device is updated with and blocks of data that were written to the external storage device or deleted from the external storage device (step 1162).

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A computer implemented method for creating and maintaining a portable computing environment, wherein one or more processors are programmed to perform steps comprising:

creating a baseline image on an external storage device connected to a host computer system, the baseline image comprising data representing a first state of a native host environment of the host computer system including data and programs installed on the host computer system, wherein the baseline image can be launched on a virtual machine;

identifying changes to a state of the native host environment, wherein identifying the changes to the state of the native host environment includes performing a block by block comparison of a first set of in-use storage locations storing data for the native host environment and a second set of corresponding locations on the external storage device, generating a first allocation bitmap representing in-use storage locations on the host computer system at which data is stored and free storage locations on the host computer system at which data is not stored, generating a second allocation bitmap representing in-use storage locations on the external storage device on which the baseline image is stored and free-storage locations on the external storage device at which data is not, and comparing the in-use storage locations of the first allocation bitmap to the in-use storage locations of the second allocation bitmap to identify changes made to the native host environment;

generating a delta image representing the identified changes to the native host environment, the delta image comprising data from changed blocks; and writing the delta image to the external storage device to provide an aggregate baseline image, the aggregate baseline image comprising the baseline image and the delta image.

2. The method of claim 1 wherein comparing the in-use storage locations of the first allocation bitmap to the in-use storage locations of the second allocation bitmap to identify changes made to the native host environment comprises:
selecting an in-use location from the first allocation bitmap;
identifying a corresponding storage location of the second allocation bitmap that corresponds to the selected in-use location;
generating a first hash value for a first block of storage associated with the selected in-use location from the first allocation bitmap;
generating a second hash value for a second block of storage associated with the identified corresponding storage location; and
comparing the first hash value to the second hash value.

3. The method of claim 2 wherein writing the delta image to the external storage device to create an aggregate baseline image comprises:
writing data from the first block of storage to the second block of storage if the first hash value is different than the second hash value; and
updating the second allocation bitmap.

4. The method of claim 2, further comprising, if the first hash value is different than the second hash value and a first timestamp associated with the first block of storage indicates that the first block of storage has been updated more recently than the second block of storage, performing the following steps:
writing data from the first block of storage to the second block of storage; and
updating the second allocation bitmap associated with the external storage device.

5. The method of claim 2, further comprising, if the first hash value is different than the second hash value and a second timestamp associated with the second block of storage indicates the second block of storage has been updated more recently than the first block of storage:
writing data from the second block of storage to the first block of storage; and
updating the first allocation bitmap associated with the host computer system.

6. The method of claim 2, further comprising, if the first hash value is different than the second hash value:
identifying a file associated with the first block of storage;
adding the file to a file conflict list, the file conflict list providing a list of files that were modified on both the host computer system and the external storage device;
displaying the file conflict list;
receiving conflict resolution input from a user;
copying blocks of data associated with the file from the host computer system to the external storage device if the conflict resolution input from the user indicates that a copy of the file from the host computer system should be copied to the external storage device;
copying blocks of data associated with the file from the external storage device to the host computer system if the conflict resolution input from the user indicates that a copy of the file from the external storage device should be copied to the host computer system; and
updating the first allocation bitmap and the second allocation bitmap.

7. A computer readable storage medium having stored thereon one or more sequences of instructions for causing one or more processors to perform the steps for creating and maintaining a portable computing environment, the steps comprising:
creating a baseline image on an external storage device connected to a host computer system, the baseline image representing a first state of a native host environment of the host computer system, the baseline image including data and programs installed on the host computer system, wherein the baseline image can be launched on a virtual machine;
identifying changes to a state of the native host environment, wherein identifying the changes to the state of the native host environment includes
performing a block by block comparison of a first set of in-use storage locations storing data for the native host environment and a second set of corresponding storage locations on the external storage device,
generating a first allocation bitmap representing in-use storage locations on the host computer system at which data is stored and free storage locations on the host computer system at which data is not stored,
generating a second allocation bitmap representing in-use storage locations on the external storage device on which the baseline image is stored and free-storage locations on the external storage device at which data is not, and
comparing the in-use storage locations of the first allocation bitmap to the in-use storage locations of the second allocation bitmap to identify changes made to the native host environment;
generating a delta image representing the identified changes to the native host environment, the delta image comprising data from changed blocks; and
writing the delta image to the external storage device to update an aggregate baseline image, the aggregate baseline image comprising the baseline image and the delta image.

8. The computer readable storage medium of claim 7 wherein comparing the in-use storage locations of the first allocation bitmap to the in-use storage locations of the second allocation bitmap to identify changes made to the native host environment comprises:
selecting an in-use location from the first allocation bitmap;
identifying a corresponding storage location on the second allocation bitmap that corresponds to the selected in-use location;
generating a first hash value for a first block of storage associated with the selected in-use location from the first allocation bitmap;
generating a second hash value for a second block of storage associated with identified in-use location from the second allocation bitmap; and
comparing the first hash value to the second hash value.

9. The computer readable storage medium 8 wherein writing the delta image to the external storage device to create an aggregate baseline image comprises
writing the first block of storage associated with the selected in-use location from the first allocation bitmap to the external storage device if the first hash value is different than the second hash value; and
updating the second allocation bitmap associated with the external storage device.

10. The computer readable storage medium of claim 8 wherein the steps further comprise, if the first hash value is different than the second hash value and a first timestamp associated with the first block of storage indicates the first block of storage has been updated more recently than the second block of storage:
    writing data from the first block of storage to the second block of storage; and
    updating the second allocation bitmap associated with the external storage device.

11. The computer readable storage medium of claim 8 wherein the steps further comprise, if the first hash value is different than the second hash value and a second timestamp associated with the second block of storage indicates the second block of storage has been updated more recently than the first block of storage:
    writing data from the second block of storage to the first block of storage; and
    updating the first allocation bitmap associated with the host computer system.

12. The computer readable storage medium of claim 8 wherein the steps further comprise, if the first hash value is different than the second hash value:
    identifying a file associated with the first block of storage;
    adding the file to a file conflict list, the file conflict list providing a list of files that were modified on both the host computer system and the external storage device;
    displaying the file conflict list;
    receiving conflict resolution input from a user;
    copying blocks of data associated with the file from the host computer system to the external storage device if the conflict resolution input from the user indicates that a copy of the file from the host computer system should be copied to the external storage device;
    copying blocks of data associated with the file from the external storage device to the host computer system if the conflict resolution input from the user indicates that a copy of the file from the external storage device should be copied to the host computer system; and
    updating the first allocation bitmap and the second allocation bitmap.

13. A portable storage device for creating and maintaining a portable computing environment, the portable storage device comprising:
    an input-output (I/O) port for connecting the portable storage device to a host computer system or a guest computer system;
    a computer readable non-volatile memory for storing data and computer executable programmed modules to be executed by a processor;
    a configuration monitoring module configured to
        monitor a state of a native host environment of the host computer system when the portable storage device is connected to the host computer system and identify changes made to the native host environment, wherein identifying the changes to the state of the native host environment includes performing a block by block comparison of a first set of in-use storage locations storing data for the native host environment and a second set of in-use storage locations storing data for an aggregate baseline image stored on the computer readable non-volatile memory, and
        monitor a state of a remote host environment on the guest computer system when the portable storage device is connected to the guest computer system and identify changes made to the remote host environment; and
    a synchronization module configured to
        create a baseline image representing a first state of the native host environment and including data and programs installed on the host computer system and storing the baseline image in the computer readable non-volatile memory, wherein the baseline image can be launched on a virtual machine,
        generate a delta image that represents changes made to the remote host environment or the native host environment as identified by the configuration monitoring module, the delta image comprising data from changed blocks,
        store the delta image in the computer readable non-volatile memory as part of an aggregate baseline image,
        update the native host environment to provide an aggregate baseline image stored in the computer readable non-volatile memory when the portable storage device is connected to the host computer system,
        generate a first allocation bitmap representing in-use storage locations on the host computer system at which data is stored and free storage locations on the host computer system at which data is not stored,
        generate a second allocation bitmap representing in-use storage locations on the computer readable non-volatile memory on which the baseline image is stored and free-storage locations on the computer readable non-volatile memory at which data is not, and
        compare the in-use storage locations of the first allocation bitmap to the in-use storage locations of the second allocation bitmap to identify changes made to the native host environment.

14. The portable storage device of claim 13 wherein the synchronization module is further configured to, when comparing the in-use storage locations of the first allocation bitmap to the in-use storage locations of the second allocation bitmap to identify changes made to the native host environment:
    select an in-use location from the first allocation bitmap;
    identify a corresponding storage location of the second allocation bitmap that corresponds to the selected in-use location;
    generate a first hash value for a first block of storage associated with the selected in-use location from the first allocation bitmap;
    generate a second hash value for a second block of storage associated with the identified corresponding storage location; and
    compare the first hash value to the second hash value.

15. The portable storage device of claim 14 wherein the synchronization module is further configured to, when writing the delta image to the computer readable non-volatile memory to create an aggregate baseline image:
    write data from the first block of storage to the second block of storage if the first hash value is different than the second hash value; and
    update the second allocation bitmap.

16. The portable storage device of claim 14 wherein the synchronization module is further configured to, if the first hash value is different than the second hash value and a first timestamp associated with the first block of storage indicates the first block of storage has been updated more recently than the second block of storage:
    write data from the first block of storage to the second block of storage; and
    update the second allocation bitmap associated with the computer readable non-volatile memory.

17. The portable storage device of claim 14 wherein the synchronization module is further configured to, if the first hash value is different than the second hash value and a second timestamp associated with the second block of storage indicates the second block of storage has been updated more recently than the first block of storage:
- write data from the second block of storage to the first block of storage; and
- update the first allocation bitmap associated with the host computer system.

18. The portable storage device of claim 14 wherein the synchronization module is further configured to, if the first hash value is different than the second hash value:
- identify a file associated with the first block of storage on the host computer system;
- add the file to file conflict list, the file conflict list providing a list of files that were modified on both the host computer system and the computer readable non-volatile memory;
- display the file conflict list;
- receive conflict resolution input from a user;
- copy blocks of data associated with the file from the host computer system to the computer readable non-volatile memory if the conflict resolution input from the user indicates that a copy of the file from the host computer system should be copied to the computer readable non-volatile memory;
- copy blocks of data associated with the file from the computer readable non-volatile memory to the host computer system if the conflict resolution input from the user indicates that a copy of the file from the computer readable non-volatile memory should be copied to the host computer system; and
- update the first allocation bitmap and the second allocation bitmap.

* * * * *